April 6, 1926.
DE FOREST C. COLEMAN
1,579,280
LIQUID METER
Filed Feb. 26, 1924     3 Sheets-Sheet 1
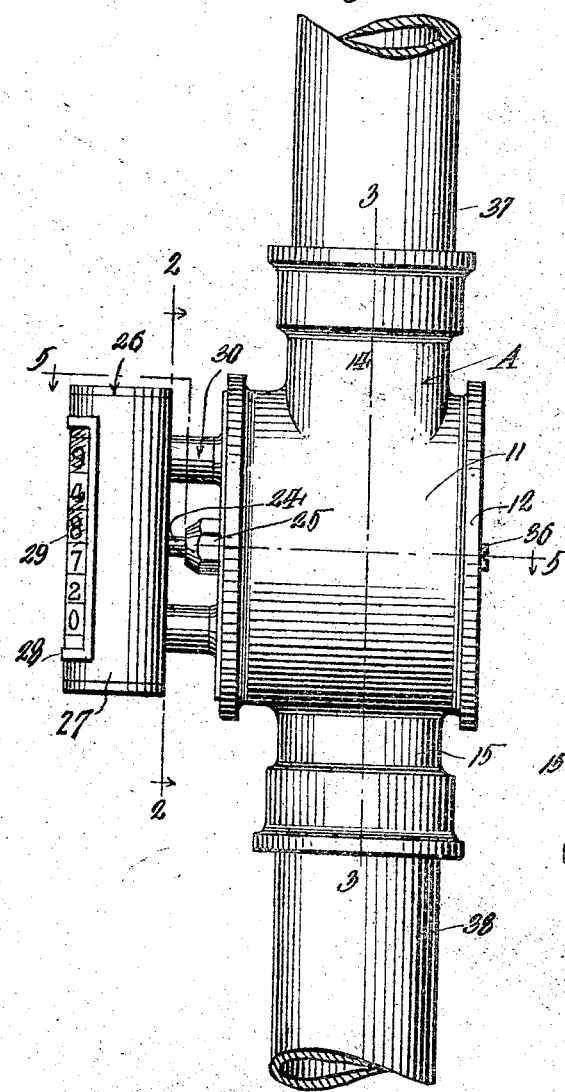
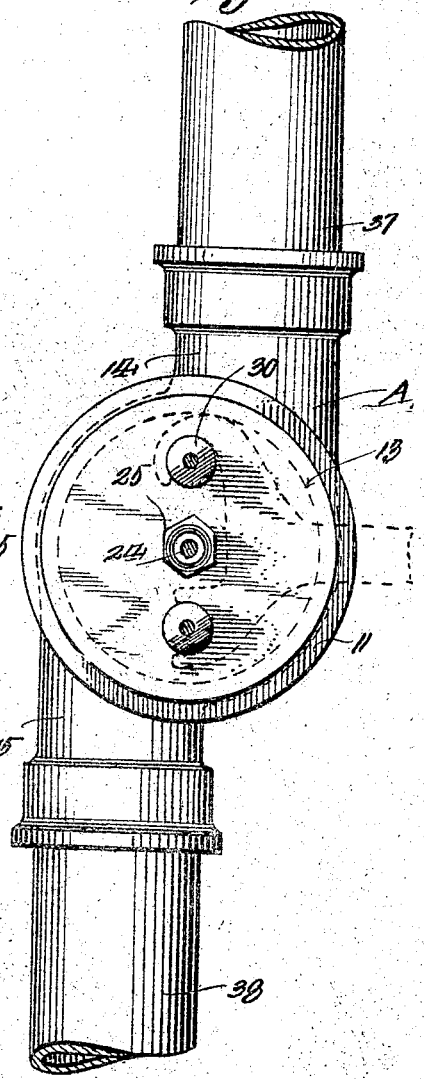

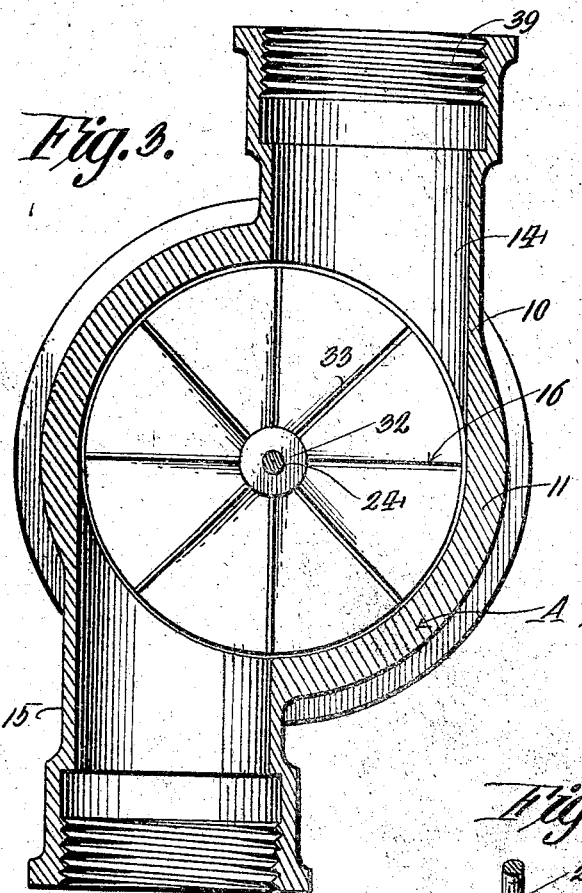
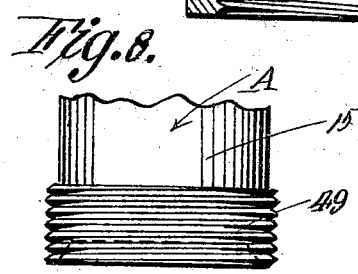
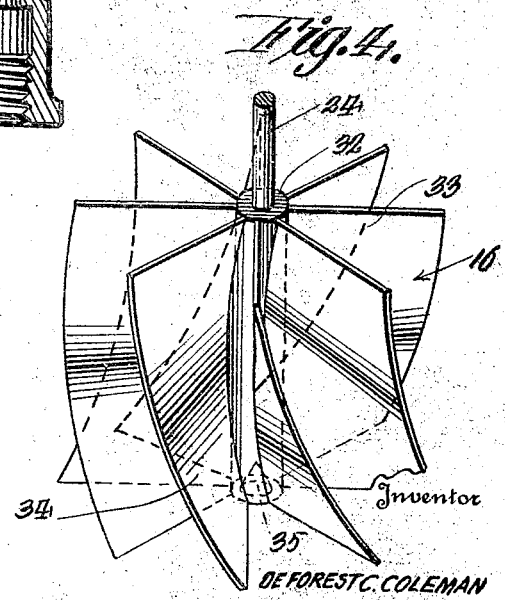

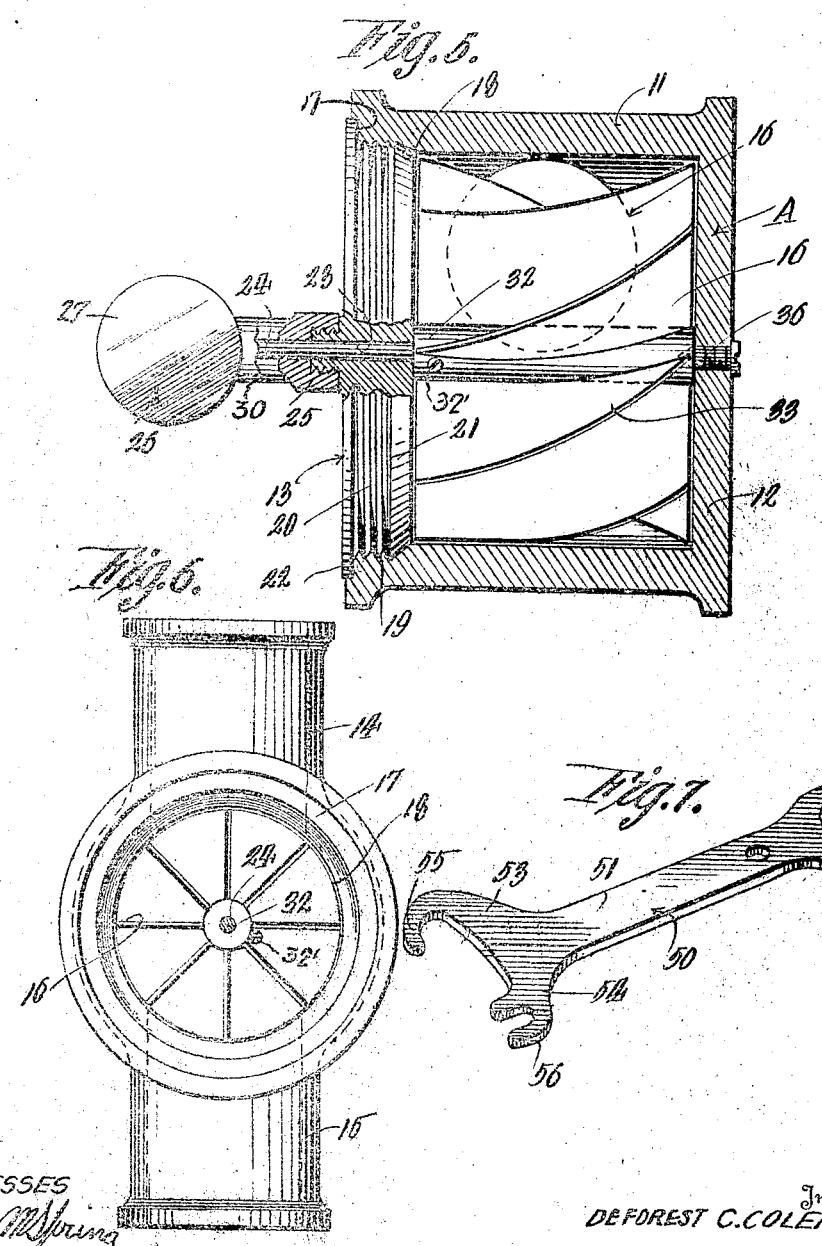

Patented Apr. 6, 1926.

1,579,280

UNITED STATES PATENT OFFICE.

DE FOREST C. COLEMAN, OF CLIFFORD, PENNSYLVANIA.

LIQUID METER.

Application filed February 26, 1924. Serial No. 695,372.

*To all whom it may concern:*

Be it known that I, DE FOREST C. COLEMAN, a citizen of the United States, residing at Clifford, in the county of Susquehanna and State of Pennsylvania, have invented certain new and useful Improvements in a Liquid Meter, of which the following is a specification.

This invention appertains to novel appliances for measuring the amount of liquid passing through a pipe, thereby permitting an accurate account to be kept of the amount of liquid being disposed of from a container or the like.

The primary object of this invention is to provide an improved device for measuring the amount of liquid passing through a pipe which embodies a casting in which is rotatably mounted an impeller wheel against the blades of which the liquid is adapted to impinge, the wheel having driving connection with an ordinary type of registering instrument.

Another object of the invention is the provision of novel means for detachably mounting the wheel within the casing and novel means for forming the casing, whereby all parts of the liquid meter can be kept in a clean and sanitary condition.

A further object of the invention is the provision of novel means for connecting the registering instrument with the cap of the casting, which is utilized for holding the impeller wheel in place, whereby the cap and the registering instrument can be detached from the casting as a single unit.

A still further object of the invention is to provide an improved liquid meter of the above character, which is durable and efficient in use, one that is simple and easy to manufacture and one which can be incorporated with a pipe line and placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a side elevation of the improved device.

Figure 2 is a section through the same taken on the line 2—2 of Figure 1 showing the supports carried by the cap for receiving the registering instrument.

Figure 3 is a longitudinal section through the meter taken on the line 3—3 of Figure 1.

Figure 4 is a detail perspective view of the impeller wheel showing the drive shaft connected therewith.

Figure 5 is a detail horizontal section through the improved device taken on the line 5—5 of Figure 1.

Figure 6 is a front elevation of a slightly modified form of the meter showing the closure cap for the casting removed from the casing or casting.

Figure 7 is a detail perspective view of the type of wrench which can be employed for connecting or removing the closure cap from the casting, and Figure 8 is a fragmentary elevation of one end of the casting showing a slightly modified form thereof for permitting a different type of coupling to be used for connecting the line pipe therewith.

Referring to the drawings in detail, wherein similar reference characters designate corresponding parts throughout the several views, the letter A generally indicates the improved liquid meter, which as shown in the drawings is particularly adapted for measuring milk or the like, but it is to be understood that the device can be used for measuring other kinds of liquid.

The improved device A comprises a casting 10 which can be formed of brass suitably nickel-plated if desired. The casting 10 includes a centrally disposed cylindrical body 11 provided with an integral end wall 12. The open end of the cylindrical body 11 is adapted to be closed by a cap or closure plug 13 which forms an important part of the present invention, as the provision of this cap or closure plug permits the easy cleaning of the entire meter. Inlet and outlet pipes 14 and 15 communicate with the opposite sides of the body and are disposed on opposite sides of the vertical diametric center of the body. The disposing of the inlet and outlet pipes 14 on opposite sides of the vertical diametric center of the body prevents back pressure on the impeller wheel 16 which will be later described. The outer face of the open end of the cylindrical body 11 is rabbeted as at 17 to provide a shoulder for a purpose, which will be hereinafter more fully described and the inner surface of the body adjacent to the shoulder 17 is provided with a tapered shoulder or seat 18 and between the shoulders 17 and 18 with female threads 19.

The cap or closure plug 13 includes a disk-shaped body having its circumference provided with male threads 20 for engaging the female threads of the cylindrical body and the inner end of the plug is tapered as at 21 to fit upon the tapered shoulder or seat 18 for forming a snug contact therewith so as to prevent the seeping of liquid from between the cylindrical body and the said plug or cap. The outer end of the cap is provided with an annular flange 22 which is adapted to fit upon the shoulder 17 for forming a further means for preventing the leakage of liquid from the said body. The axial center of the cap or closure plug is provided with a bearing 23 for receiving the drive shaft 24, which is detachably associated with the impeller wheel 16. A suitable packing nut 25 is adapted to be threaded on the cap 13 around the drive shaft 24 so as to effectively prevent the seeping of liquid from between said shaft and cap. The drive shaft 24 is utilized for operating a registering instrument 26 which is of the usual or any preferred character and therefore this registering instrument will not be described in detail. As shown, however, the registering instrument 26 embodies a cylindrical casing 27 provided with a suitable sight opening 28 through which the counter cylinders 29 are adapted to appear. The drive shaft 24 extends directly into the casing 27 for engaging the operating mechanism for the said counter cylinders or disks 29.

In order to effectively hold the registering instrument 26 in place against accidental movement, the cap is provided on each side of its axial center with integral supporting lugs 30, and these lugs can receive screws 31 which can extend through the casing 27 of the registering instrument into the said lugs. It is thus obvious that the cap or closure plug 13 and the register 26 can be removed from the casting as a single unit.

The impeller wheel 16 includes a hub 32 which supports the radially extending helical blades 33 against which the liquid to be measured is adapted to impinge. These blades 33 are curved transversely as indicated by the reference character 34 and as clearly shown in Figure 4 of the drawings. The hub 32 of the wheel 16 has one end thereof provided with a suitable bore for receiving the drive shaft 24 and this shaft can be detachably held in the bore by a set screw 32' or the like. The opposite end of the hub is provided with a conical bearing seat 35 in which is adapted to fit the conical end of a bearing pin 36 which is threaded into the end wall 12 at the axial center thereof.

By this construction it can be seen that as the liquid flows through the casting or cylindrical casing 11, that the same will impinge against the blades or vanes 33 of the impeller wheel 16 which will cause the rotation thereof. The rotation of the impeller wheel will in turn operate the drive shaft 24 through the medium of which is operated the registering instrument 26.

Thus it is obvious that by referring to the said register, the amount of liquid being dispensed through the casting can be readily seen.

The improved device is adapted to be incorporated in a suitable pipe line and as shown, inlet and outlet pipes 37 and 38 communicate with the inlet and outlet nipples 14 and 15. In Figure 3 these inlet and outlet nipples 14 and 15 are shown provided with internal threads 39 for receiving the said pipes 37 and 38, but if so desired the same can be provided with external threads 39 as shown in Figure 8 of the drawings for permitting the use of a coupling sleeve for connecting the pipes with the said nipples.

In Figure 6, I have shown a slightly modified form of the improved device in which the inlet and outlet nipples 14 and 15 are disposed in direct vertical alignment, and thus in this instance, the said nipples communicate with the cylindrical body 11 at opposite diametric points. While the device will operate efficiently as shown in Figure 6 of the drawings, the preferred arrangement is shown in Figures 1 to 3 inclusive.

The cap or closure plug 13 can be readily attached to or removed from the casting or cylindrical body 11 by the use of a wrench 50 as illustrated in Figure 7 of the drawings. This wrench 50 as shown, embodies a shank 51, one end of which is provided with a rigid jaw wrench 52 for engaging the packing nut 25 while the opposite end thereof is provided with oppositely extending laterally disposed arms 53 and 54. The arm 53 is provided with a hook 55 for engaging about one of the lugs 30 while the opposite arm is provided with a yoke 56 for straddling the other lug and for permitting the wrench to turn thereon. It can be seen that when the yoke 56 is placed on one lug and the hook 55 on the other, that a grip can be readily obtained on the cap or closure plug for permitting the easy turning thereof.

Changes in details may be made without departing from the spirit or the scope of this invention.

What I claim as new is:

In a liquid meter, a casting including a cylindrical body, a rigid end wall for the body, and nipples communicating with the body, the body having formed thereon adjacent to the open end thereof an abrupt shoulder and a tapered shoulder, and female threads disposed between the shoulders, a plug having a bearing opening formed in the axial center thereof provided with a tapered face for engaging the tapered shoulder, and an annular flange for fitting upon the abrupt shoulder, male threads formed upon the plug between the tapered face and flange, an impeller wheel including a hub provided with a bore therethrough rotatably mounted within the cylindrical body, a drive shaft extending through the bore of the hub and said bearing opening in the cap, means detachably connecting the hub with the drive shaft, rigid lugs formed on the outer face of the cap, a registering instrument rigidly connected with the lugs and operatively connected to the drive shaft, the lugs forming means for permitting the rotation of the cap by a suitable tool.

In testimony whereof I affix my signature.

DE FOREST C. COLEMAN.